United States Patent
Coules

[11] 4,007,516
[45] Feb. 15, 1977

[54] QUARTER TURN LOCKING FASTENER DEVICE

[75] Inventor: Ronald A. Coules, Barrington, Ill.

[73] Assignee: Richco Plastic Company, Chicago, Ill.

[22] Filed: May 19, 1975

[21] Appl. No.: 578,474

[52] U.S. Cl. .................................. 24/221 R; 85/82
[51] Int. Cl.² .................. A44B 17/00; F16B 13/04
[58] Field of Search ........... 24/221 R, 221 A, 73 P, 24/73 PF, 73 SP, 73 RM; 85/5 R, 80–84

[56] References Cited
UNITED STATES PATENTS

| | | | |
|---|---|---|---|
| 3,272,061 | 9/1966 | Seckerson | 85/82 |
| 3,378,219 | 4/1968 | Biesecker | 85/84 X |
| 3,406,431 | 10/1968 | Armstrong et al. | 85/80 X |
| 3,534,936 | 10/1970 | Knowlton | 24/221 R X |
| 3,811,157 | 5/1974 | Schenk | 24/221 R |

FOREIGN PATENTS OR APPLICATIONS

| | | | |
|---|---|---|---|
| 235,307 | 9/1961 | Australia | 24/73 PF |
| 1,139,976 | 1/1969 | United Kingdom | 85/80 |
| 1,256,295 | 12/1971 | United Kingdom | 24/221 R |

*Primary Examiner*—Donald A. Griffin

[57] ABSTRACT

A quarter turn locking fastener device consisting of a socket part adapted to snap engage into an apertured chassis and to support an apertured panel spaced apart from the chassis, and a complemental stud part adapted for selected locking and unlocking engagement through the panel aperture and into the socket part upon a quarter turn of the stud part relative to the socket part to removably secure the panel spaced apart from and on the chassis and to lock the socket part to the chassis when the stud part is in locked condition.

5 Claims, 8 Drawing Figures

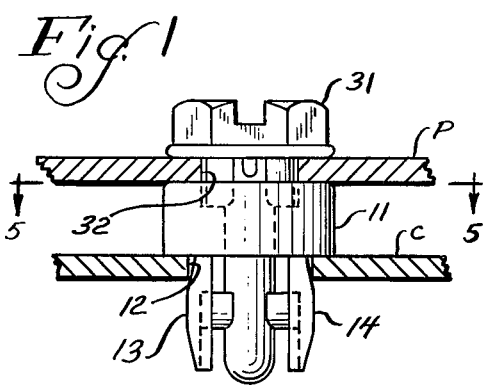
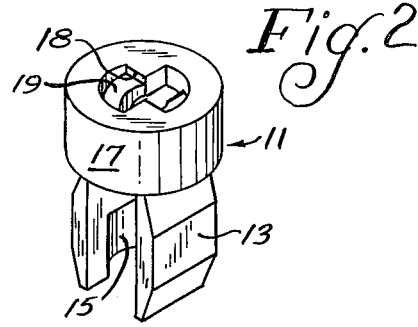
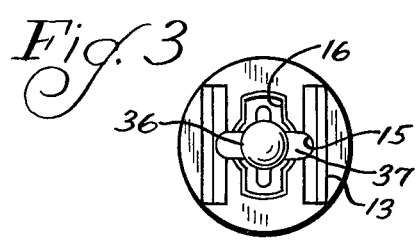
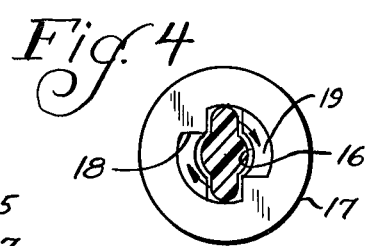
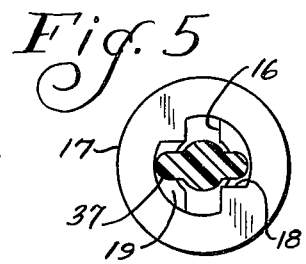
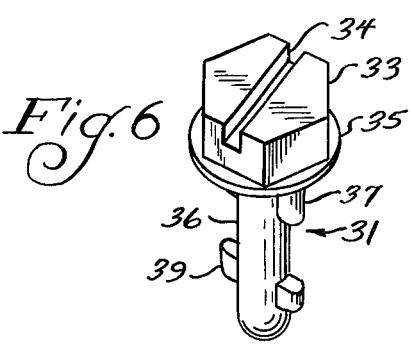
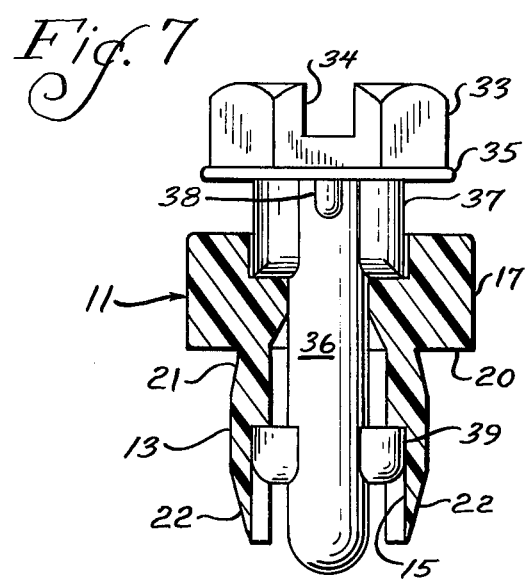
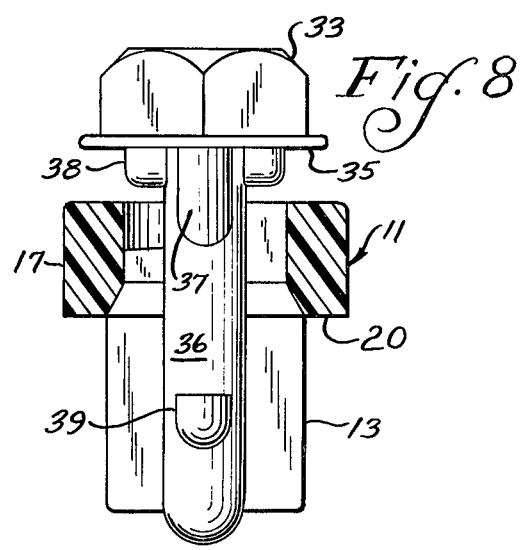

4,007,516

QUARTER TURN LOCKING FASTENER DEVICE

BACKGROUND OF THE INVENTION

This invention relates to quarter turn fasteners of the type for securing a panel spaced apart from and on a chassis, and is more particularly concerned with such a fastener of the character described having a socket part adapted to snap engage in an apertured chassis and to support an apertured panel spaced apart from the chassis, and a complemental stud part adapted for selected locking and unlocking engagement through the panel aperture and into the socket part upon a quarter turn of the stud part relative to the socket part to removably secure the panel spaced apart from and on the chassis and to lock the socket part to the chassis when the stud part is in locked condition.

Quarter turn fasteners are commonly used in electronic equipment, for example, in mounting a circuit board elevated and removably secured on a chassis or for detachably mounting an access panel to the equipment. Preferably, the fastener is molded from plastic material having dielectric insulating properties, so that a short in the chassis will not be transmitted to the panel. Also, the locking and unlocking engagement must be positive as to ascertain that the panel is secured or removable. Also, the fastener must be fast and easy to mount, lock and unlock.

OBJECTS OF THE INVENTION

It is therefore an object of the present invention to provide a quarter turn locking fastener device of the character referred to which has positive locking and unlocking means for securing a socket part on an apertured chassis and for locking a stud part through an apertured panel to the socket part.

Another object is to provide a quarter turn locking fastener which permits locking of an apertured panel to and spaced apart from an apertured chassis.

Another object is to provide a quarter turn locking fastener device which is easy to manufacture, install and use.

Other objects and advantages of the present invention will become apparent as this description proceeds, with reference to the accompanying drawings and in the light of the appended claims.

BRIEF DESCRIPTION OF THE DRAWINGS

In the drawings:

FIG. 1 is a side elevational view of the fastener embodying the invention securing a panel on a chassis, the panel and chassis being shown in section.

FIG. 2 is a perspective view of the socket part of the fastener.

FIG. 3 is a bottom plan view of the locked fastener shown in FIG. 1.

FIG. 4 is a top view of the fastener socket part, showing the stud in section and in unlocked condition.

FIG. 5 is a view similar to FIG. 4, except taken on line 5 — 5 of FIG. 1 and showing the stud in locked condition.

FIG. 6 is a perspective view of the stud part of the fastener.

FIG. 7 is a view of the assembled fastener, showing the socket part in section, the fastener being in locked condition.

FIG. 8 is a view similar to FIG. 7, except showing the fastener in unlocked condition.

DESCRIPTION OF THE PREFERRED EMBODIMENT

The fastener embodying the present invention has a socket part 11, which is adapted to snap engage in a suitable aperture 12 formed in a chassis C, by means of a pair of diametrically opposed flexible wings 13, each having an enlargement 14 for retaining the socket part in the aperture. The interior of the socket part has a pair of diametrically opposed grooves 15, one on each wing 13, and a keyway 16 is provided on a peripheral collar 17 forming the upper portion of the socket part. Adjacent the keyway on the inside surface of the collar is a stop 18 and a platform 19, and the collar has a peripheral flange 20 on its lower surface which is adapted to seat on the upper surface of the chassis C when the socket part 11 is secured in the chassis aperture 12.

When socket part 11 is press fit into the aperture, the wings 13 are forced toward one another until the enlargement 14 passes through the aperture, whereupon the wings return to normally open position, and the chassis C is snugly cam-engaged by the upper tapered portions 21 of the wings 13. The free ends 22 of the wings 13 may also be tapered from the englargement 14 to facilitate easy initial entry of the wings into the aperture 12.

A stud part 31, for entering a suitable aperture 32 formed in a panel P, is structural to engage the socket part 11 and to anchor the panel to and spaced apart from the chassis C. This stud part 31 may have a hexagonal head 33 and a slot 34 to permit convenient use of a tool therein and an enlarged bottom wall 35 is provided to engage the panel P. Depending centrally from the bottom wall 35 is a shaft 36, on which is formed a key 37 and lock ribs 39 for interlocking with the socket part 11; there may also be provided on the shaft adjacent the bottom wall 35 a pair of centering ribs 38 in a plane perpendicular to the key and lock ribs.

In operation, after the socket part 11 has been snap engaged into the aperture 12 of the chassis C, the aperture 32 of the panel P is aligned with the socket part, and the shaft 36 is inserted through the panel aperture. Shaft lock ribs 39 are rotated to clear the keyway 16 for further insertion into the part until the key 37 bears upon the platform 19 and the stud is rotated 90° until the key, riding on the platform, bears against the stop 18. Such 90° rotation of the shaft 36 also causes the lock ribs 39 to snap engage into the wing grooves 15, thus not only locking the panel P spaced apart from the chassis C, but also locking the entire assembly together thus preventing unintended flexing of the wings 13 for withdrawal of the socket part 11 from its aperture 12. Unlocking and withdrawal of the panel P from the chassis C may be accomplished by merely reversing the insertion procedure, i.e. rotating the stud part 31 90° to clear the lock ribs 39 from their grooves 15 and withdrawing the shaft from the keyway 16. Preferably, the platform 19 is slightly inclined from the stop 18 and toward the keyway 16 as to bias the lock ribs 39 into the keyway 16 during shaft insertion and to tighten up the key 37 during locking, and for ease of operation during unlocking. When locked, the panel P is prevented from shifting by reason of the centering ribs 38 which, together with the keys 37, substantially fill the panel aperture 32.

While I have illustrated and described a preferred embodiment of the invention in considerable detail, it should be apparent that changes and modifications may be made in the construction of the interlocking parts without departing from the spirit or scope of the invention. Accordingly, I do not desire to be limited to the exact construction shown and described.

I claim:

1. A quarter turn fastener comprising a socket part and a stud part for removably securing an apertured panel on and spaced apart from an apertured chassis, flexible means on the socket part for snap locking said socket part in said chassis aperture, means on the socket part for spacing said panel from said chassis, a head on the stud part adapted to bear upon said panel, a shaft depending from said head and adapted to extend through said panel aperture and into said socket part, cooperating ribs on the stud part and shouldered grooves on the socket part for locking and unlocking said parts together upon selective rotation of said stud part relative to said socket part, said snap locking means being adaptable to secure said socket part in said chassis aperture when the stud part is disposed in locking position, and means on the stud part adjacent to the head engageable in the panel opening to prevent shifting of the panel.

2. The quarter turn fastener recited in claim 1, wherein said snap locking means comprises diametrically opposed wings extending into said chassis aperture.

3. The quarter turn fastener recited in claim 1, wherein the spacing means comprises a collar having a central keyway adapted to receive said stud part therethrough, and a tapered platform and stop means in the collar surrounding said keyway.

4. The quarter turn fastener recited in claim 3, wherein the means on the stud part includes a key adaptable to be rotated on said platform between the stop means to urge the stud part ribs into abutment with the shoulder in the grooves.

5. The quarter turn fastener recited in claim 1, wherein panel centering ribs extend outwardly radially from said shaft adjacent said head.

* * * * *